(12) United States Patent
Wismer et al.

(10) Patent No.: US 7,488,423 B2
(45) Date of Patent: Feb. 10, 2009

(54) SYSTEM AND METHOD OF SLURRY TREATMENT

(75) Inventors: Michael W. Wismer, Lino Lakes, MN (US); Richard Woodling, Boulder Creek, CA (US); James C. Day, St. Paul, MN (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 137 days.

(21) Appl. No.: 11/195,108

(22) Filed: Aug. 2, 2005

(65) Prior Publication Data

US 2007/0029260 A1 Feb. 8, 2007

(51) Int. Cl.
*B01D 15/00* (2006.01)

(52) U.S. Cl. .................. 210/663; 210/688; 210/748; 210/757

(58) Field of Classification Search .......... 210/663, 210/688, 748, 757
See application file for complete search history.

(56) References Cited

U.S. PATENT DOCUMENTS

| | | | |
|---|---|---|---|
| 2,271,482 A | 1/1942 | Hoelkeskamp et al. |
| 3,301,542 A | 1/1967 | Medford, Jr. et al. |
| 3,428,449 A | 2/1969 | Swanson |
| 3,440,036 A | 4/1969 | Spinney |
| 3,658,697 A | 4/1972 | Huether |
| 3,870,033 A | 3/1975 | Faylor et al. |
| 3,873,581 A | 3/1975 | Fitzpatrick et al. |
| 3,912,801 A | 10/1975 | Stephens |
| 3,914,374 A | 10/1975 | Koehler et al. |
| 3,923,741 A | 12/1975 | Asano et al. |
| 3,928,192 A | 12/1975 | Katzakian, Jr. et al. |
| 3,941,837 A | 3/1976 | Asano et al. |
| 3,959,129 A | 5/1976 | White et al. |
| 3,985,648 A | 10/1976 | Casolo |
| 4,010,099 A | 3/1977 | Leach et al. |
| 4,070,281 A | 1/1978 | Tagashira et al. |
| 4,210,530 A | 7/1980 | Etzel et al. |
| 4,231,888 A | 11/1980 | Dalton |
| 4,303,704 A | 12/1981 | Courduvelis et al. |
| 4,329,210 A | 5/1982 | Merchant et al. |
| 4,569,769 A | 2/1986 | Walton et al. |
| 4,629,570 A | 12/1986 | Kennedy, Jr. |
| 4,666,683 A | 5/1987 | Brown et al. |
| 5,045,213 A | 9/1991 | Bowers |
| 5,149,437 A | 9/1992 | Wilkinson et al. |
| 5,225,087 A | 7/1993 | Kardos |

(Continued)

FOREIGN PATENT DOCUMENTS

EP 0 761 603 A1 3/1997

(Continued)

OTHER PUBLICATIONS

Walter F. Worth, "The ESH impact of advanced lithography materials and processes," *Semiconductor Fabtech-23rd Edition*, Jul. 2004, pp. 37-42.

(Continued)

*Primary Examiner*—Chester T Barry

(57) ABSTRACT

Wastewater streams from semiconductor processing operations are treated to reduce the concentration therein of one or more metal species to a satisfactory level. The disclosed systems and technique utilize complexing ion exchange media to treat the wastewater streams having a significant concentration of oxidizing species.

39 Claims, 3 Drawing Sheets

U.S. PATENT DOCUMENTS

| | | | |
|---|---|---|---|
| 5,256,187 A | 10/1993 | Gefvert | |
| 5,298,168 A | 3/1994 | Guess | |
| 5,346,627 A | 9/1994 | Siefert et al. | |
| 5,348,588 A | 9/1994 | Winston | |
| 5,348,712 A | 9/1994 | Marquis et al. | |
| 5,348,724 A | 9/1994 | Hagimori et al. | |
| 5,437,797 A | 8/1995 | Helmig | |
| 5,464,605 A | 11/1995 | Hayden | |
| 5,476,883 A | 12/1995 | Abe et al. | |
| 5,558,775 A | 9/1996 | Busch, Jr. | |
| 5,599,515 A | 2/1997 | Misra et al. | |
| 5,616,790 A | 4/1997 | Arnold et al. | |
| 6,069,209 A * | 5/2000 | Darling et al. | 525/332.2 |
| 6,106,728 A | 8/2000 | Lida et al. | |
| 6,203,705 B1 | 3/2001 | James et al. | |
| 6,306,282 B1 * | 10/2001 | Dungan et al. | 205/574 |
| 6,315,906 B1 | 11/2001 | Sassaman, Jr. et al. | |
| 6,346,195 B1 * | 2/2002 | Filson et al. | 210/668 |
| 6,521,131 B1 * | 2/2003 | Hamilton et al. | 210/662 |
| 6,747,065 B1 * | 6/2004 | Paszkowski | 516/83 |
| 6,818,129 B2 * | 11/2004 | Kemp et al. | 210/251 |
| 6,878,285 B2 | 4/2005 | Hughes | |
| 6,896,808 B1 | 5/2005 | Jay | |
| 7,048,857 B2 * | 5/2006 | Jangbarwala | 210/652 |
| 2001/0008828 A1 * | 7/2001 | Uchikura et al. | 451/41 |
| 2002/0077035 A1 * | 6/2002 | Wang et al. | 451/41 |
| 2002/0104803 A1 * | 8/2002 | Filson et al. | 210/688 |
| 2003/0044335 A1 | 3/2003 | Jangbarwala | |

FOREIGN PATENT DOCUMENTS

| | | |
|---|---|---|
| JP | 55062794 | 5/1980 |
| JP | 06-121978 | 5/1994 |
| JP | 08-024897 | 1/1996 |
| JP | 08-039054 | 2/1996 |
| JP | 08-141579 | 6/1996 |
| JP | 09-117763 | 5/1997 |
| JP | 10-111387 | 4/1998 |
| WO | WO 97/29048 A1 | 8/1997 |

OTHER PUBLICATIONS

Michael W. Wismer et al., "Copper CMP treatment using the Copper Select™ process," *Semiconductor Fabtech-25$^{th}$ Edition*, Feb. 2005, pp. 1-5.

P.h. Haumessera et al., "Copper metallization for advanced interconnects: the electrochemical revolution," *Semiconductor Fabtech-23$^{rd}$ Edition*, Jul. 2004, pp. 85-89.

Dr. Liang Chen, "Breakthrough technology for CMP," *Semiconductor Fabtech-24$^{th}$ Edition*, Oct. 2004, pp. 137-141.

Jay M. Dietrich, "Management of Copper CMP effluents," *Semiconductor Fabtech-24$^{th}$ Edition*, Oct. 2004, pp. 51-55.

BIRM® Product Literature, Clack Corporation, Jun. 2003.

"Ion Exchange Resins for the Remediation of Groundwater," Product Literature, Sybron Chemicals, Inc., publication date unknown.

Phil Fatula, "Technical Briefing—A Progress Report on the Direct Application of Imidodiacetic-functional IX Resins in Cu CMP Waste Treatment," *Ultrapure Water*, vol. 22, No. 5, Jul./Aug. 2005, pp. 30-31.

F.X. McGarvey et al., "Removal and Recovery of Metals by Ion Exchange," Sybron Chemicals, Inc.23$^{rd}$ Annual Liberty Bell Corrosion Course 4, 1985, pp. 1-9.

John Weems, "Lessons Learned: The installation of a 300 to 600 GPM semiconductor high-purity water system," *Ultrapure Water*, Sep. 1999, pp. 26-30.

Mary Reker et al., "Treatment and water recycling of copper CMP slurry waste streams to achieve environmental compliance for copper and suspended solids," *Semiconductor Fabtech-8$^{th}$ Edition*, 15 pages, publication date unknown.

* cited by examiner

SYSTEM AND METHOD OF SLURRY TREATMENT

BACKGROUND OF THE INVENTION

1. Field of Invention

This invention relates to a system and method for reducing the concentration of one or more metal species from a waste stream and, in particular, to a system and apparatus for removing one or more metal species from chemical mechanical planarization waste slurry streams.

2. Discussion of Related Art

Techniques can be employed for reducing the concentration of the one or more target species from a stream. For example, Medford et al., in U.S. Pat. No. 3,301,542, disclose a system for treating acidic etching solutions. Swanson et al., in U.S. Pat. No. 3,428,449, disclose extraction of copper from acidic liquors with a phenolic oxime. Spinney, in U.S. Pat. No. 3,440,036, discloses the recovery of copper from copper-bearing solutions. Stephens, in U.S. Pat. No. 3,912,801, discloses the solvent extraction of metals with a cyclic alklylene carbonate. Koehler et al., in U.S. Pat. No. 3,914,374, disclose the removal of residual copper from nickel solutions. Asano et al., in U.S. Pat. No. 3,923,741, disclose an acrylamide aqueous solution refining process. Asano et al., in U.S. Pat. No. 3,941,837, further disclose a method of treating an aqueous solution of acrylamide. Leach et al., in U.S. Pat. No. 4,010,099, disclose settlers for copper liquid extraction systems. Etzel et al., in U.S. Pat. No. 4,210,530, disclose the treatment of metal plating wastes with an unexpanded vermiculite cation exchange column. Dalton, in U.S. Pat. No. 4,231,888, discloses a composition used for extracting copper from aqueous copper salts. Merchant et al., in U.S. Pat. No. 4,239,210, disclose a method of regenerating etchant and recovering etched metal. Brown et al., in U.S. Pat. No. 4,666,683, disclose a process for removal of copper from solutions of chelating agent and copper. Gefvart, in U.S. Pat. No. 5,256,187, discloses the separation of precious metals by an ion exchange process. Guess, in U.S. Pat. No. 5,298,168, discloses a ferrous dithionite process and composition for removing dissolved heavy metals from water. Siefert et al., in U.S. Pat. No. 5,346,627, disclose a method for removing metals from a fluid stream. Marquis et al., in U.S. Pat. No. 5,348,712, disclose the use of carbonates in metal ion extraction. Hayden, in U.S. Pat. No. 5,464,605, discloses a process for the decomposition and removal of peroxides. Abe et al., in U.S. Pat. No. 5,476,883, disclose a preparation process of acrylamide from purified acrylonitrile. Misra et al., in U.S. Pat. No. 5,599,515, disclose a method of removing mercury from solution. Sassaman et al., in U.S. Pat. No. 6,315,906, disclose removing metal ions from wastewater. Filson et al., in U.S. Pat. No. 6,346,195, disclose the ion exchange removal of metals from wastewater. Kemp et al., in U.S. Pat. No. 6,818,129, similarly disclose the ion exchange removal of metal ions from wastewater. However, Kemp et al., in U.S. Pat. No. 6,818,129, notes that if hydrogen peroxide is present, it cannot be present with some resins because of its incompatibility. Kemp et al. further note that ion exchange can be used to attach copper ions, but would not likely work on a polishing slurry stream because of the presence and amount of solids present therein, typically in the form of silica, alumina slurry.

SUMMARY OF THE INVENTION

In accordance with one or more embodiments, the invention is directed to a method of treating a slurry stream. The method can comprise acts of providing the slurry stream comprising at least one metal and at least one oxidizer present at a concentration of at least about 50 mg/L and introducing the slurry stream into an ion exchange column.

In accordance with one or more embodiments, the invention is directed to a method of treating a chemical mechanical polishing slurry stream. The method can comprise an act of introducing the slurry stream into a treatment system consisting essentially of at least one ion exchange unit comprising a chelating ion exchange resin.

In accordance with further embodiments, the invention is directed to a method for fabricating an electronic component. The method can comprise a chemical mechanical polishing the electronic component with a slurry and introducing at least a portion of the slurry to a treatment system consisting essentially of an ion exchange column comprising ion exchange material comprising an iminodiacetate functional group.

In accordance with one or more embodiments, the invention is directed to a treatment system for treating a slurry stream which can comprise at least one metal selected from the group consisting of copper, lead, nickel, zinc, cobalt, cadmium, iron, manganese, and tungsten and at least one oxidizing species selected from the group consisting of nitric acid, hydrogen peroxide, ferric nitrate, and ammonium persulfate present at a concentration of at least about 50 mg/L. The treatment system can comprise an inlet fluidly connected to a source of the slurry stream and a means for reducing the concentration of the at least one metal from the slurry stream.

In accordance with one or more embodiments, the invention is directed to a method of facilitating treatment of a slurry stream having at least one metal species. The method comprises an act of providing a treatment system consisting essentially of an ion exchange column having ion exchange media contained therein. The ion exchange media comprises at least one pendant functional group capable of forming a complex with the at least one metal species.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawing.

DETAILED DESCRIPTION

Figure 1:
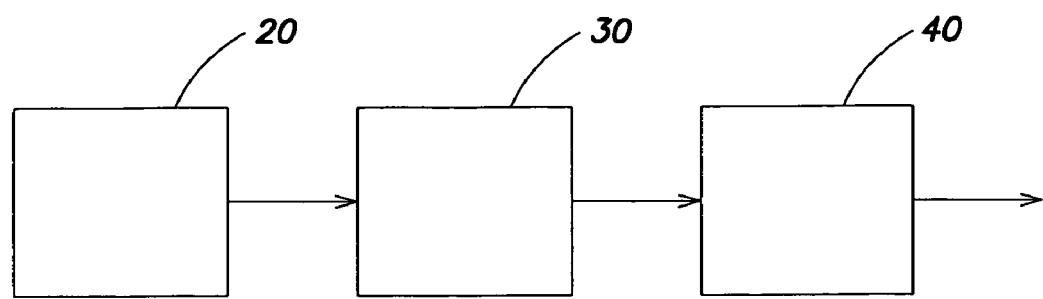
FIG. 1 is a schematic illustration of a treatment system in accordance with one or more embodiments of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

In accordance with one or more embodiments, the invention provides systems and techniques that remove, or at least reduce a concentration of, metal ions from a solution or stream. In some cases, the processes and systems of the invention may be utilized to remove one or more undesirable species, such as metal ions, from one or more fluid streams, typically one or more wastewater streams. In accordance with further embodiments, the invention provides systems and techniques that remove, or at least reduce the concentration of, one or more transition metal ions from solutions and/or streams containing high amounts of suspended solids (also referred to herein as particulate material), such as slurry streams. In some cases, the invention provides systems and techniques that remove, or at least reduce the concentration of, copper ions from one or more slurry streams. For example, the processes and systems of the invention can remove copper ions, from a wastewater from a byproduct polishing slurry from a chemical mechanical polishing (CMP) of integrated circuits to attach the metal ions and form an environmentally clean water discharge product. The phrase "environmentally clean" refers to a wastewater discharge stream to a municipal wastewater treatment plant such that the wastewater discharge stream contains copper ions in a concentration less than about 0.5 mg/L (about 0.5 ppm). In accordance with still further embodiments, the treatment system and techniques of the invention can comprise, consist essentially of, or consist of, one or more ion exchange unit operations that can remove the one or more target species from the one or more slurry streams and can render the one or more slurry streams suitable for discharge to the environment. As used herein, the phrase "suitable for discharge" refers to treated streams wherein the concentration of one or more regulated species contained therein is at a level not greater than government controlled limits. Thus, the systems and techniques of the invention can be utilized to facilitate fabrication of one or more semiconductor devices, and/or one or more types of semiconductor devices, by delivering a dischargeable slurry stream that meets or exceeds one or more imposed regulatory constraints. In accordance with one or more embodiments, the systems and techniques of the invention can remove or at least reduce the concentration of one or more target metal species to a level or concentration that satisfies environmental discharge limits and/or guidelines. In accordance with some aspects of one or more embodiments of the invention, the disclosed systems and techniques can comprise one or more treatment systems that comprises, in some cases, consists essentially of, one or more unit operations that contacts the slurry stream and removes therefrom one or more target species.

The systems and techniques of the invention can also be utilized to effect concentration reduction of contaminants such as, but not limited to, transition metals, from one or more streams comprising entrained particulate materials. Solids or particulate materials are defined herein using Standard Methods 2540 B, Total Solids Dried at 103-105° C. (1998, 20$^{th}$ Ed.).

The systems and techniques of the invention can be utilized to remove metal species from a wastewater stream. In accordance with one or more embodiments, the systems and techniques of the invention removes metal ions such as, but not limited to copper metal ions, from a wastewater stream such as a byproduct polishing slurry stream, from one or more chemical mechanical planarization processes during fabrication operation directed to integrated circuit microchips devices.

Semiconductor manufacturing processes typically utilize one or more metals such as, but not limited to, aluminum and/or transition metals, such as copper and tungsten, in one or more operations during fabrication operations of microchip devices or components. Chemical mechanical planarization or polishing (CMP) is one technique that can be utilized during the fabrication operations of such devices. CMP operations can be utilized to produce smooth surface on such semiconductor devices. Typical CMP processes utilize one or more polishing slurries to facilitate the planarization process. The polishing slurry is typically used with a polishing pad to remove excess or undesirable metal material from the semiconductor device. To further or facilitate the planarization process, the polishing slurry typically comprises one or more abrasive materials and, in some cases, one or more agents that facilitate the planarization process.

During the CMP process, silicon and other metals are typically removed from the semiconductor device and carried in a chemical mechanical polishing slurry stream. In particular, CMP planarization operations performed on copper-based microchip devices can produce a byproduct "grinding" (polishing) slurry wastewater stream which typically comprises a metal species, typically as ions, at a concentration ranging from about 1 mg/L to about 100 mg/L. A typical CMP tool can produce a chemical mechanical slurry stream at a flow rate of about 10 gpm, typically including rinse streams. However, because fabrication facilities typically operate a plurality of such tools, a sufficient quantity of one or more metals copper can be present in the aggregate slurry stream at a concentration, quantity, or volume that can represent an environmental concern, if discharged without treatment. For example, a multiple copper CMP tool cluster can generate about 100 gpm of wastewater.

The stream to be treated can comprise one or more oxidizers or oxidizing agents as an additive. The oxidizing agent can be any species that facilitates dissolution of the metal species, e.g., copper. For example, the oxidizing agent can be nitric acid, hydrogen peroxide ($H_2O_2$), ferric nitrate, and ammonium persulfate, as well as mixtures or combinations thereof. Other, non-limiting examples of oxidizers or precursor thereof include iodates, periodates, bromates, perbromates, chlorates, perchlorates, peroxygen compounds, nitrate compounds, persulfate compounds, permanganate compounds, and chromate compounds. The oxidizing agent can be present in the slurry stream at a concentration sufficient to facilitate metal dissolution, e.g. transition metal dissolution. For example, the concentration of the one or more oxidizing agents can be at least about 50 mg/L, typically in a range from about 50 mg/L to about 1,000 mg/L.

One or more chelating agents, such as citric acid or ammonia, also can be present in the byproduct slurry stream to be treated to facilitate maintaining one or more transition metals therein in solution. The slurry wastewater stream can also have solids or particulates, typically sized in a range from about 0.001 to about 1 μm, at a level or concentration from about 500 to about 5,000 mg/L (about 500 to about 5,000 ppm). Complexing agents, such as gluconates, tartrates, citric acid, and ammonium hydroxide, that facilitate etching or enhancing the corrosion rate of transition metals, such as copper, may also be present in the CMP slurry stream. Table 1 lists common CMP slurry stream constituent as well as their typical concentrations.

Notably, ion exchange media suppliers and equipment manufacturers encourage particulate material removal ahead, i.e., upstream, of ion exchange systems and emphasize that solids removal operations form an essential aspect of pretreatment systems because particles can bind and block the ion exchange media and operate as a particulate filter. Consequently, without removal thereof, the suspended solids accumulate resulting in an increase in pressure drop across the resin bed. The increased pressure drop typically further results in channeling phenomena, wherein the fluid stream to be treated is directed to a flow path of least resistance, effectively circumventing at least a portion of the resin bed, limiting the contact between the resin and the process fluid. This results in high contaminant leakage and poor bed capacity. The suspended solids and colloidal matter can also coat the ion exchange media, reducing the rate of diffusion of the ionic species to and from media. Ion exchange media manufacturers further proscribe pre-treating the stream to be treated to remove or neutralize soluble constituents that degrade the ion exchange media. Such species include, for example, oxygen, ozone, chlorine, hydrogen peroxide and other oxidants or oxidizing species or agents. Thus, prior art systems utilizing ion exchange media include one or more pre-treatment unit operations that remove such particulates and/or oxidizing species. The systems and techniques of the invention, in contrast, inventively eliminates, if not reduces, the reliance on such additional complexities in treating particulate streams, which may also contain one or more oxidizing species.

TABLE 1

Typical CMP Slurry composition.

| Constituent | Concentration |
| --- | --- |
| Dissolved copper | 5-100 mg/L |
| Total solids | 500-5,000 mg/L |
| Oxidizing agents | 50-1,000 mg/L |
| Etchants | 200 mg/L |
| Complexing agents | 10-400 mg/L |
| DI water background | 99%+ |
| pH | 6 to 7 |

In accordance with one or more aspects, the ion exchange media utilized in the systems and techniques of the invention comprises, consists essentially of, or consists of one or more materials that can form or promote formation of one or more chelate complexes with the one or more target species. For example, the ion exchange media can comprise one or more functional groups that can form one or more ligands or complexes with one or more metal species. Thus, in accordance with some aspects of the invention, the ion exchange media comprises one or more ligands or chelating moieties, typically as a pendant group on a substrate. The one or more functional groups can have any suitable functionality that can bind or immobilize one or more target species thereby effecting removal from a carrying fluid or fluid to be treated, or at least a reduction in a concentration thereof. Thus during treatment operations, the one or more target species can be bound or otherwise secured to the ion exchange media material through the one or more functional groups. The one or more pendant groups can be supported on a polymer, or other supporting media, that comprises the ion exchange media material. Thus, the ion exchange media can comprise a first region having a first functionality and a second region having a second functionality. Further, the ion exchange media can comprise any number or types of such functional groups at various concentrations or densities thereof that provides a desired loading capacity. Thus, for example, the ion exchange media can have a first region comprising a functional group at first density or concentration, typically on a volume basis, and one or more second regions comprising a second functional group at a second, or other density or concentration. The first and second regions can differ with respect to one or more aspects to provide flexibility in capturing one or more target species but can comprise the same functional group.

In accordance with one or more embodiments, the systems and techniques of the invention can provide a method of removing or at least reducing the concentration of copper ions. The method comprises contacting a stream containing copper ions with a treatment system comprising, consisting essentially of, or consisting of an ion exchange bed comprising complexing ion exchange media, preferably without performing prior removal of solids or particulates and/or prior removal or reduction of oxidizing species by catalytic exposure to carbon. Contacting the stream can involve introducing the stream into one or more ion exchange beds in a downward flow direction or in an upward flow direction.

In other cases, the invention pertains to pretreatment systems that involve no chemical addition. For example, the pretreatment system can neutralize, remove, or at least reduce the concentration of any oxidizer that may be present in the stream to be treated. For example, the pretreatment system can introduce energy that facilitates reduction of the oxidizer. Non-limiting examples of such pretreatment systems include, but are not limited to, electrochemical, photochemical, and thermochemical techniques.

For example, electrochemical techniques can utilize one or more electrochemical cells comprising an anode and cathode (electrodes) connected to an externally supplied electrical source to introduce an electrical current into a liquid. The cell can be configured as a batch tank, a flow through pipe, or other configuration in which the solution containing the oxidizer comes into electrical communication with the electrodes. In such an arrangement, one or more of the electrodes is depleted of electrons, which are transferred to the other electrode through the external connection. Reduction reactions can thus occur at the cathode and oxidation reactions can correspondingly occur at the anode. Supplied current as, for example, a direct current is typically controlled by a rectifier. The amount of current, amperage, used can depend on several factors or condition such as the solution characteristics and/or the concentration and type of pertinent chemical species, and the rate at which reduction is performed or desired.

Photochemical techniques typically provide an actinic radiation that promotes one or more reactions. For example, the photochemical techniques can utilize ultraviolet radiation to promote one or more reduction reactions.

Thermochemical techniques can involve heating a solution containing an oxidizer to a temperature which promotes decomposition of the oxidizing species. For example, for copper CMP slurry wastewater, the temperature could be up to and including the water boiling point (about 100° C.). At the elevated temperature, reactions, including the rate of reduction or decomposition reactions typically increase thus promoting the destruction of the one or more oxidizing species.

The complexing ion exchange media typically comprises at least one complexing or chelating functionality. The functionality comprises any group, typically a multidentate group, which forms a complex with the target species. For example, the ion exchange media can comprise an iminodiacetic functional group on a polymeric backbone. Other functional groups that can be utilized in accordance with one or more embodiments of the invention, include, but are not limited to, polyamine, bispicolylamine, and aminophosphonic groups.

The selection of the functional group may depend of several factors including, for example, the affinity for a target species. Thus, for example, the selection of the one or more functional groups to be utilized may depend on the target metal species, e.g. a transition metal, which can be any one or more of copper, lead, nickel, zinc, cobalt, cadmium, iron, tantalum, silver, gold, platinum, palladium, iridium, rhodium, ruthenium, manganese, tungsten, and hafnium and/or gallium.

As exemplarily shown in FIG. 1, one or more collection tanks 30 may be utilized to collect one or more streams to be treated from one or more CMP systems 20 prior to processing in a treatment system 40. Optionally, an acid or a base (not shown) may be introduced to adjust a pH of the stream to be treated.

In some cases, the treatment system can comprise two or more ion exchange beds arranged in parallel or in series, or combinations thereof. For example, the treatment system can comprise two trains each comprising a first ion exchange bed and a second ion exchange bed downstream of the first bed. The first ion exchange be can be considered as the primary bed, typically removing or reducing the concentration of the target metal species in the slurry stream and the second, downstream ion exchange bed can be considered as the polishing bed that removes any residual target species. The primary and polishing beds may be interchanged as necessary. For example, the primary bed can be replaced after a predetermined period or upon a detection of an unacceptable condition, or concentration, one or more target species in the exiting stream. The polishing bed can be placed in the primary position, and a freshly regenerated column can be placed as the polishing position. The spent ion exchange bed can be reconditioned and/or regenerated.

The ion exchange media typically comprises a chelating functionality pendant on a cross-linked polymer backbone. The supporting substrate or backbone of most ion exchange resins is typically composed of long chains of polystyrene. Resin manufacturers typically improve the strength and to render the resins insoluble in water and/or non-aqueous solvents, polystyrene chains are typically reacted with a crosslinking agent such as divinyl benzene (DVB). The reaction typically joins multiple chains of polystyrene together through one or more links. Oxidizers attack and destroy not only the functional pendant groups on the resin but also attack and destroy the DVB links. All oxidizers attack both the functional group and the DVB crosslinks. As more DVB crosslinks are destroyed, the resin absorbs and swells with water and softens. In use, the softened resin will expand and squeeze together which will prevent or inhibit fluid flow therethrough. Some oxidizing species are more aggressive than others and higher oxidizer concentration accelerates the rate of deterioration. Other conditions, such as low or high pH, heat, and the presence of catalysts also accelerates the rate of deterioration. In some cases, transition metals like copper can catalyze oxidative degradation of resin especially under acid conditions. Typically, the chelating ion exchange media can have an operating capacity in the range of about 1.5 to 2.0 pounds or more of metal per cubic foot.

The ion exchange media typically has a maximum uniformity coefficient of about 1.7. The ion exchange resin of the process and apparatus of the present invention is screened to control bead size. The ion exchange resin of the process and apparatus of the present invention can have the following typical properties.

Treated slurry stream exits the treatment system in a state that is suitable for discharge as discussed above. Optionally, the treated stream can be further treated in one or more post-treatment systems (not shown). For example, solids may be removed therefrom in one or more filtering unit operations or systems. One or more agents, such as coagulating and/or flocculating agents, may be utilized to improve the one or more post-treatment processes. Examples of other unit operations that can be utilized in the post-treatment system include, but are not limited to, reverse osmosis processes and other systems and techniques that can further reduce other target species from the stream.

TABLE 2

Typical properties of ion exchange resin.

| Characteristic | Value |
|---|---|
| Bead size min. 90% | 0.4-1.23 mm |
| Effective size | 0.55 mm |
| Uniformity coefficient | 1.7 |
| Bulk weight (+/−5%) | 800 g/l |
| Density | 1.18 g/ml |
| Water retention | 50-55 wt % |
| pH range | 0-14 |
| Functional group | iminodiacetic |
| Structure | macroporous |
| Matrix | cross-linked polystyrene |
| Minimum Capacity | 2.2 eq/L in $H^+$ form |

Regeneration of the laden, typically saturated, ion exchange media may be effected by utilizing one or more mineral acids, such as sulfuric acid, to remove the complexed metal species therefrom. However, hydrochloric acid may be advantageously utilized in some cases.

EXAMPLES

The function and advantages of these and other embodiments of the invention can be further understood from the examples below, which illustrate the benefits and/or advantages of the one or more systems and techniques of the invention but do not exemplify the full scope of the invention.

In the examples, copper in solution was measured according to Standard Methods 3120 B, Metals by Inductively Coupled Plasma (ICP) Method or 3125 B, Inductively Coupled Plasma/Mass Spectrometry (ICP/MS) Method (1998, $20^{th}$ Ed.).

Solids levels were measured according to U.S. EPA Method 160.3.

Hydrogen peroxide concentration was measured by direct titration with standardized potassium permanganate reagent.

The ion exchange resin utilized was LEWATIT® TP207 weakly acidic, macroporous ion exchange resin with chelating iminodiacetate groups, which was acquired from Sybron Chemicals Inc., a LANXESS Company, Birmingham, N.J.

Example 1

Performance of Ion Exchange Resin Exposed to an Oxidizer

In this example, a treatment system in accordance with one or more embodiments of the invention including an ion exchange column utilizing a chelating ion exchange resin was exposed to an oxidizer. The effective capacity of the exposed ion exchange resin was used to characterize deterioration and effect on its performance.

Figure 2:
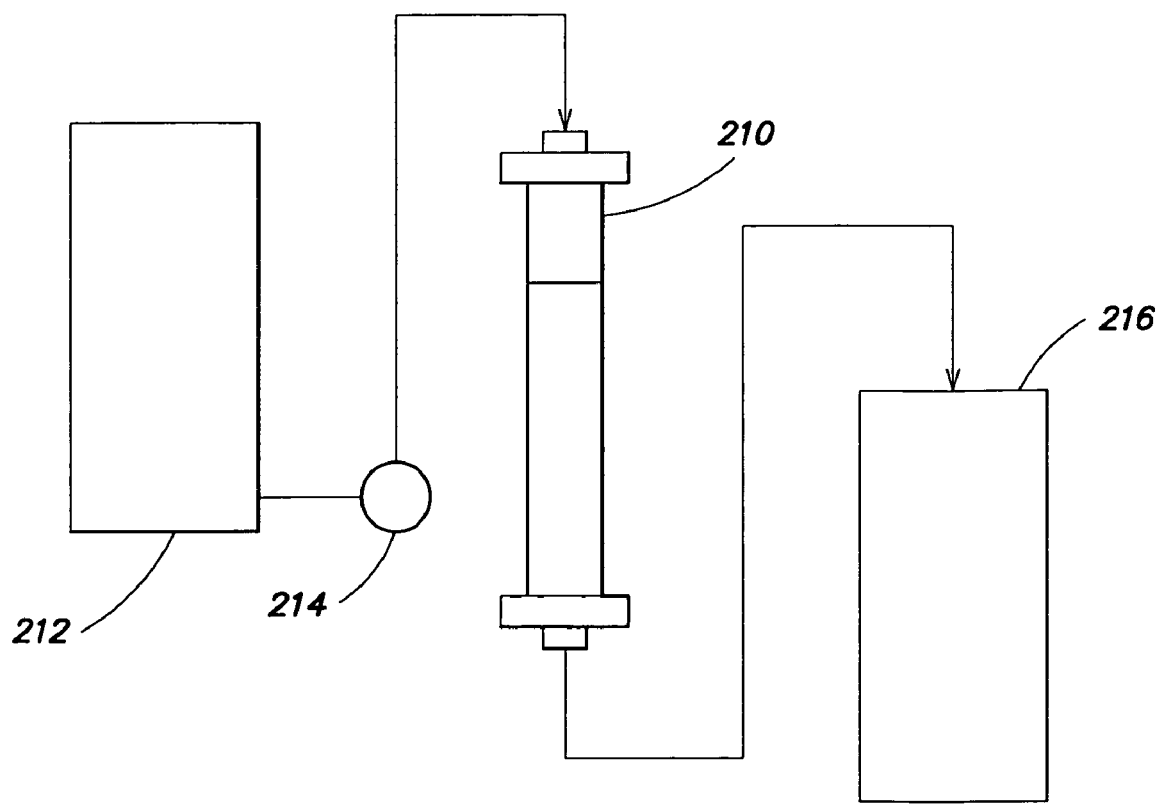
FIG. 2 is a schematic illustration of a treatment system in accordance with one or more embodiments of the invention as described in Examples 1 and 2.

The treatment system is schematically shown in FIG. 2. The system consisted essentially of an ion exchange column 210 including ion exchange resin therein. A pump 214 was used to withdraw a copper-containing solution from a source or feed tank 212 and introduce into ion exchange column 210.

An effluent holding tank 216 was utilized to collect the treated fluid from ion exchange column 210. No recirculation of the solution was performed so that the ion exchange material was exposed to a solution having the same initial and final copper concentration. Prior to the first run, the resin was preconditioned by hydrating it for at least twenty-four hours in deionized water, then converting it fully to the acid form by exposure an about 10% hydrochloric acid solution.

The ion exchange column had a resin bed that was about 1.5 cm in diameter and was about 16 cm deep.

Several runs were performed by exposing the resin bed to various oxidizer-containing solutions. The solution was also comprised of about 40 mg/L of copper species, as a salt of the sulfate. Exposure was performed by passing the various solutions through the ion exchange column for about eight hours and holding at a dormant, non-flowing condition for about sixteen hours of each day. The pH of the solution was adjusted to be about 3 pH units by adding sufficient sulfuric acid.

The oxidizer used was hydrogen peroxide at the various concentration levels noted in Table 3. Table 3 further lists the measured capacity of the ion exchange bed after exposure at various time intervals during exposure. The capacity of the bed was normalized relative to unexposed resin. Specifically, ion exchange resin not exposed to an oxidizer was designated as having a capacity of 1.0 and the resin capacity during exposure was designated relative to the unexposed capacity. Thus, for example, oxidizer-exposed ion exchange resin having a capacity that was determined to be about half of the unexposed resin was designated as having a capacity of about 0.5. Determination of resin capacity can be performed by relative saturation. For example, the resin can be stripped of the metal by regeneration with an about 10% hydrochloric acid solution. About two liters of a copper sulfate solution, containing about 3,000 mg Cu/L, is passed through about 25 ml of resin to completely exhaust the ion resin exchange sites with copper species. Excess copper solution is rinsed from the resin. The copper is stripped from the resin with about 0.5 L of about an about 10% hydrochloric acid solution. This strip solution is captured and analyzed for total copper content. The amount of copper determined therein relates directly to the number of usable exchange sites per unit volume of ion exchange resin (virgin resin being assigned a value of 1.0). Exposure to oxidizing species or reagents renders some exchange sites unusable so the amount of copper that can be loaded per unit volume of resin decreases with degradation. Compared to virgin resin, therefore, the value is less than 1.0 for oxidizer-exposed resins.

The data in Table 3 show that the capacity of the ion exchange resin degraded with prolonged exposure. Further, the rate of degradation accelerated at higher oxidizer concentrations.

TABLE 3

Effect of Oxidizer Exposure on Iminodiacetate Resin.

| Exposure Time (hours) | $H_2O_2$ Concentration (mg/L) | | | | |
|---|---|---|---|---|---|
| | 0 | 50 | 100 | 500 | 1,000 |
| 0 | 1 | 1 | 1 | 1 | 1 |
| 264 | | 1 | 1 | | |
| 384 | 1 | | | 1 | 1 |
| 552 | | 1 | 0.94 | | |
| 672 | 0.99 | | | 0.97 | 0.89 |
| 936 | 1.03 | | | 0.86 | 0.77 |
| 1056 | | 0.99 | 0.99 | | |
| 1320 | 1 | 0.94 | 0.91 | 0.82 | 0.71 |
| 1560 | 0.99 | | | 0.7 | 0.58 |
| 1584 | | 0.94 | 0.88 | | |
| 1776 | 1.01 | 0.95 | 0.91 | 0.66 | 0.51 |
| 1968 | | 0.92 | 0.88 | | |
| 2016 | 0.98 | | | 0.58 | 0.43 |
| 2256 | | | | 0.52 | 0.38 |
| 2280 | | 0.92 | 0.86 | | |
| 2496 | | 0.87 | 0.83 | | |
| 2784 | | 0.89 | 0.82 | | |
| 3144 | | 0.88 | 0.80 | | |
| 3384 | | 0.82 | 0.75 | | |

Example 2

Performance of Ion Exchange Resin When the Oxidizer is Chemically Neutralized

In this example, a treatment system in accordance with one or more embodiments of the invention comprising an ion exchange column with chemical neutralization of an oxidizer was evaluated for metal treatment capacity. The treatment system is schematically shown in FIG. 2 and has been substantially described in Example 1. The neutralizing or reducing agent was sodium metabisulfite. However, other reducing agents such as sodium bisulfite and sodium sulfite, can be utilized. The neutralization of hydrogen peroxide with sodium sulfite, sodium bisulfite, or sodium metabisulfite results in formation of sodium sulfate ($Na_2SO_4$). The initial concentration, prior to neutralization, of hydrogen peroxide in the solution to be treated is listed in Table 4. The resultant concentration of sodium sulfate product is also listed. The initial concentration of metal species, copper (sulfate), for each test run solution was about 40 mg/L. The starting pH of each solution was about 3 pH units.

The ion exchange column had a resin bed that was about 1.5 cm in diameter and was about 16 cm deep.

Citric acid was included as an organic chelator for copper and is typically used in copper CMP slurry formulations. It typically complexes the copper ions produced during a copper CMP process so that precipitation and/or re-absorption onto the semiconductor surface of such species are inhibited. Organic chelators bind copper to varying degrees. Typically, the stronger the force binding copper in the chelate, the more difficult it is for ion exchange resins to remove the copper from the chelate and take it up on the ion exchange resin. High salt background can also impair copper sorption from the solution onto the resin, in this case by high ionic background. When chemical reducing agents, like sodium bisulfite, are used to chemically decompose oxidizers, like hydrogen peroxide, the resulting chemical reaction increases the total solution ionic background. Specifically, the reaction between sodium bisulfite and peroxide can yield sodium and sulfate ions in solution. The higher the oxidizer concentration, the more bisulfite is required to neutralize and, therefore, the greater the resulting ionic background.

Table 4 lists the number of equivalent bed volumes (BV) passed through the resin bed before effluent therefrom was found to be about 30 mg/L, designated as breakthrough condition, or about 75% of the influent metal concentration. Table 4 compares copper loading on the ion exchange for three cases. The "Blank", or baseline, case shows copper loading when no chelator (e.g. citric acid) is present and with only a small ionic background loading. The "Citric" case shows copper loading when an amount of a chelating agent, citric acid, at a level typically present in copper CMP wastewater, is added to the baseline. In this case, little additional ionic background results since citric acid is only partially ionized in solution. The "Sulfate" case shows copper loading when the ionic background is significantly increased in the absence of citric acid. The amount of sodium sulfate salt is equivalent to that formed if about 1,100 ppm of hydrogen peroxide were removed by sodium bisulfite (in the other two cases, the amount is equal to removal of about 200 ppm of the peroxide). The results show that the citric acid and sulfate cases are essentially the same as the baseline case and the increase in background ionic loading by use of a chemical reducing agent has no appreciable negative impact on copper removal by the ion exchange resin, regardless of whether citric acid is present.

TABLE 4

Effect of High Sulfate Exposure.

| Test Solution Composition | | | |
|---|---|---|---|
| Copper (mg/L) | 40 | 40 | 40 |
| BTA (mg/L) | 500 | 500 | 500 |
| $Na_2SO_4$ (mg/L) | 800 | 800 | 4,500 |
| Citric Acid (mg/L) | 0 | 500 | 0 |
| pH | 3 | 3 | 3 |
| $H_2O_2$, before treatment (mg/L) | 200 | 200 | 1,000 |

| BV Breakthrough (to about 30 mg/L) | | | |
|---|---|---|---|
| Run | "Blank" | "Citric" | "Sulfate" |
| 1 | 2,000 | 1,920 | 2,140 |
| 2 | 1,900 | 1,640 | 2,320 |
| 3 | | 2,080 | |

BTA is 1,2,3-benzotriazole. BTA is an "alkyl/aryl triazoles anti-tarnish" component that is typically present copper CMP slurry formulations. BTA typically prevents copper oxide formation on the polished copper remaining on the semiconductor device during and after CMP processes.

Example 3

High Total Solids Streams

This example shows the performance of a treatment system in accordance with one or more embodiment of the invention in treating a slurry stream from a CMP process. Evaluation was performed for about twenty days. This test also shows the effectiveness of copper uptake by the resin even in the presence of an oxidizer.

Figure 3:
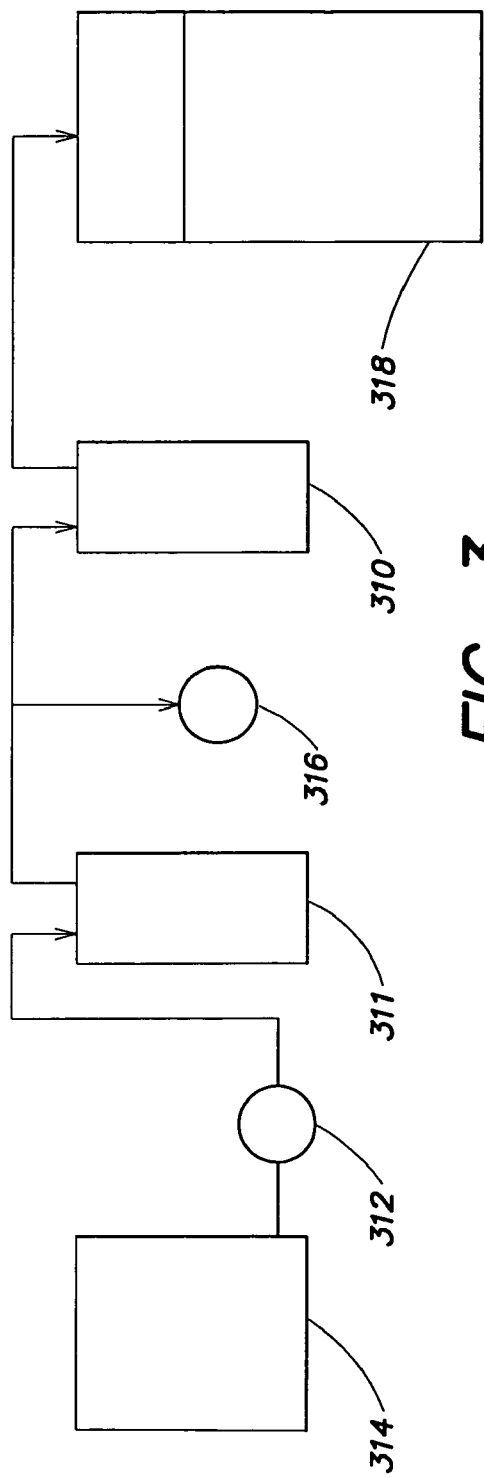
FIG. 3 is a schematic illustration of a treatment system described in Examples 3 and 4.

The system, schematically illustrated in FIG. 3, was comprised of an ion exchange column 310 downstream of a carbon column 311. A pump 312 was utilized to drive a CMP solution from a feed tank 314 through carbon column 311 and ion exchange column 310. A sample point 316 was disposed between carbon column 311 and ion exchange column 310. Treated fluid from ion exchange column 310 was collected in collection tank 318.

The system was operated about eight to twelve hours per day, shut down at the end of each day and restarted the next day. After twelve days, ion exchange testing was stopped and hydrogen peroxide removal by carbon continued for an additional eight days. Flow of the slurry feed solution through the carbon and ion exchange tanks was even and steady throughout the test, indicating no solids build up on either media. Examination of the media at the conclusion of the test showed no slurry solids accumulation in either media.

Simulated copper CMP slurry wastewater was prepared. Aliquots of commercially manufactured copper CMP slurry concentrate were diluted to the total solids test conditions. The slurry solution was prepared by diluting commercially available copper CMP slurry and adding hydrogen peroxide and copper sulfate to simulate copper CMP slurry wastewater. Calculated amounts of copper sulfate (as crystalline technical grade $CuSO_4.5H_2O$) from Chem One Ltd., Houston, Tex., and hydrogen peroxide (about 30% $H_2O_2$, electronics grade) from Ashland Specialty Chemical, Dublin, Ohio., were added to the influent slurry solution. The hydrogen peroxide concentrations of the slurry stream in and out of the ion exchange resin bed are listed for each day. Similarly, the inlet and outlet copper concentrations along with the solids inlet concentration are also correspondingly listed. The pH was adjusted to about 3 pH units by adding sulfuric acid. Particle size of the solids was in the range of from about 0.001 µm to about 1 µm.

Ion exchange column 310 had a resin bed that was about 8 inches in diameter and was about 40 inches deep. Carbon column 311 was about 14 inches in diameter and was about 40 inches deep. The carbon utilized was CENTAUR® granular activated carbon, available from Calgon Carbon Company, Pittsburgh, Pa.

Samples were retrieved and analyzed at the indicated hours listed in Table 5. The data in Table 5 shows that even with total solids loading of up to about 4,500 mg/L, copper can still be removed. Further, the removal of hydrogen peroxide need not be performed for effective copper removal as shown by the results from runs performed on days 4, 5, and 7. The total solids in the test in Table 5 are largely from the slurry particulate solids themselves, i.e., the silica and alumina used for grinding and polishing. Very little of the solids are from dissolved ions like copper and sulfate.

TABLE 5

Effect of High Total Solids.

| Day | Run Time (hours) | Cumulative Run Time (hours) | $H_2O_2$ Concentration (mg/L) IN | $H_2O_2$ Concentration (mg/L) POST CARBON | Copper Concentration (mg/L) IN | Copper Concentration (mg/L) OUT | Solids Concentration, IN (mg/L) |
|---|---|---|---|---|---|---|---|
| 1 | 1 | 8 | 524 | <0.3 | 26.2 | 0.052 | 3,370 |
|   | 8 |   | NA | <0.3 | 26 | 0.033 | 3,680 |
| 2 | 1 | 16 | NA |   | 28.6 | 0.024 | 3,450 |
|   | 8 |   | 520 | <0.3 | 29.8 | 0.046 | 4,515 |
| 3 | 1 | 24.5 | 450 |   | 27.6 | 0.032 | 3,360 |
|   | 8.5 |   | 520 | <0.3 | 27.2 | 0.027 | 3,180 |
| 4 | 1 | 32.5 | 384 |   | 29 | 0.025 | 4,000 |
|   | 8 |   | NA | 17 | 28.5 | 0.027 | 3,750 |
| 5 | 1 | 40.5 | 428 | 4 | 29.3 | <0.04 | 3,785 |
|   | 8 |   | 410 | 16.4 | 31 | <0.04 | 3,980 |
| 6 | 1 | 48.5 | 377 | <0.3 | 27.1 | 0.114 | 3,870 |
|   | 8 |   | 402 | <0.3 | 27.7 | <0.04 | 3,420 |
| 7 | 1 | 60.5 | 610 | 3.5 | 28.6 | <0.04 | 3,930 |
|   | 12 |   | 493 | <0.3 | 25.4 | <0.04 | 3,580 |
| 8 | 1 | 72.5 | 503 | <0.3 | 25 | <0.04 | 3,540 |
|   | 12 |   | 463 | <0.3 | 31.5 | 0.053 | 4,090 |
| 9 | 1 | 84.5 | 510 | <0.3 | 28.7 | <0.04 | 3,760 |
|   | 12 |   | 517 | <0.2 | 26.9 | 0.156 | 3,400 |
| 10 | 1 | 96.5 | 500 | <0.3 | 27.1 | 0.079 | 3,350 |
|   | 12 |   | 524 | <0.2 | 23.2 | 0.124 | 2,840 |
| 11 | 1 | 108.5 | 525 | <0.3 | 27.1 | 0.127 | 3,420 |
|   | 12 |   | 502 | <0.2 | 27.1 | 0.167 | 3,790 |
| 12 | 1 | 120.5 | 563 | <0.2 | 27.6 | 0.08 | 3,800 |
|   | 12 |   | 510 | <0.2 | 25.1 | 1.61 | 3,480 |
| 13 | 1 | 129 | 428 | 4 |   |   | ~3,500 |
|   | 8.5 |   | 410 | 16.4 |   |   | ~3,500 |
| 14 | 1 | 137.3 | 377 | <0.3 |   |   | ~3,500 |
|   | 8.3 |   | 402 | <0.3 |   |   | ~3,500 |
| 15 | 1 | 146.1 | 610 | 3.5 |   |   | ~3,500 |
|   | 8.8 |   | 493 | <0.3 |   |   | ~3,500 |
| 16 | 1 | 155.1 | 503 | <0.3 |   |   | ~3,500 |
|   | 9 |   | 463 | <0.3 |   |   | ~3,500 |
| 17 | 1 | 163.6 | 510 | <0.3 |   |   | ~3,500 |
|   | 8.5 |   | 517 | <0.2 |   |   | ~3,500 |
| 18 | 1 | 171.8 | 500 | <0.3 |   |   | ~3,500 |
|   | 8.2 |   | 524 | <0.2 |   |   | ~3,500 |
| 19 | 1 | 180.6 | 525 | <0.3 |   |   | ~3,500 |
|   | 8.8 |   | 502 | <0.2 |   |   | ~3,500 |
| 20 | 1 | 189.6 | 563 | <0.2 |   |   | ~3,500 |
|   | 9 |   | 510 | <0.2 |   |   | ~3,500 |

Example 4

Hydrogen Peroxide Removal with Carbon and Filter Media

In this example, a waste slurry stream from a CMP process was treated in a treatment system comprising a pretreatment subsystem. The treatment system, substantially shown in FIG. 3, was comprised of a pretreatment system 311, which was a carbon column or a filter media column, and an ion exchange column 310. A pump 312 was utilized to introduce the solids, oxidizer, and copper containing solution from feed tank 314. Treated slurry was collected and sampled in a collection tank 318.

Hydrogen peroxide in the slurry stream was removed and/or neutralized by utilizing the pretreatment system having CENTAUR® granular activated carbon, available from Calgon Carbon, Company, Pittsburgh, Pa., or with BIRM® granular filter media, available from Clack Corporation, Windsor, Wis. The CENTAUR® granular activated carbon system consisted essentially of a column about 8 inches in diameter and about 40 inches deep. The BIRM® granular filter media subsystem consisted essentially of a column about 8 inches in diameter and about 20 inches deep. For each of the runs, the corresponding ion exchange column had about the same dimensions as the respective carbon or filter media columns.

The influent and post treatment copper total solids and hydrogen peroxide concentrations in the slurry stream are listed in Tables 6 and 7. The data shows that both pretreatment systems can reduce or remove hydrogen peroxide concentration and that copper species was effectively removed by the ion exchange column.

Example 5

Figure 4:
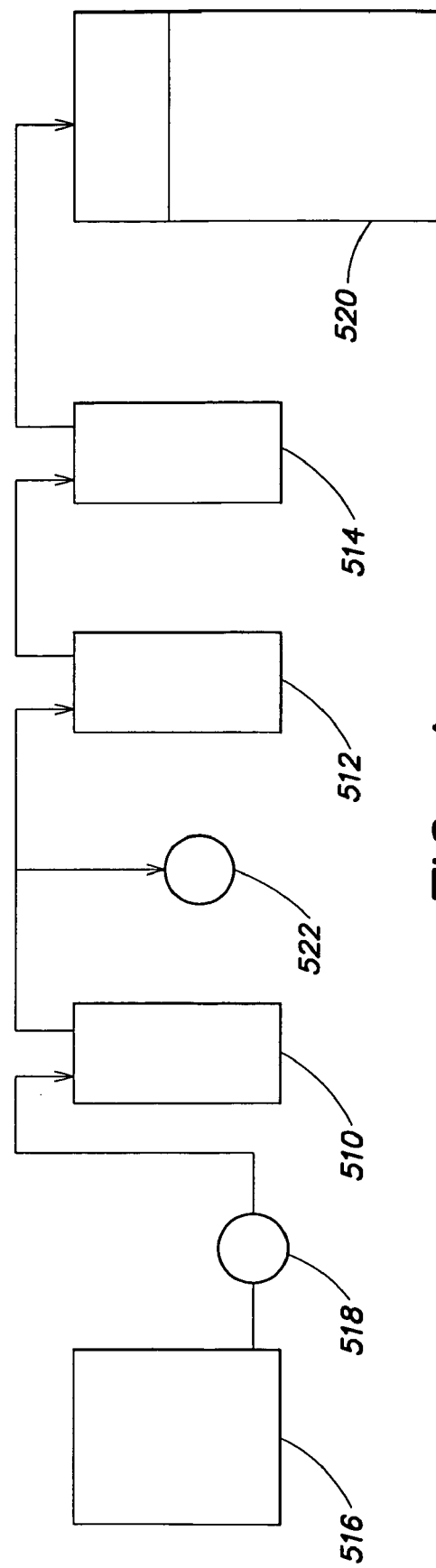
FIG. 4 is a schematic illustration of yet another treatment system described in Example 5.

Performance of Ion Exchange Varying Total Solids and Hydrogen Peroxide Concentration Slurry wastewater obtained from a commercial copper CMP process was used to evaluate oxidizer and metal removal by a pretreatment subsystem with a carbon bed and a treatment system with two ion exchange beds as schematically illustrated in FIG. 4. The carbon bed 510 was comprised of about 3.6 ft³ CENTAUR® granular activated carbon and the ion exchange beds 512 and 514 were each comprised of about 3.6 ft³ LEWATIT® TP207 weakly acidic, macroporous ion exchange resin with chelating iminodiacetate groups. The slurry fluid was introduced from feed tank 516 into the system by utilizing pump 518. Total solids, hydrogen peroxide, and copper concentrations were adjusted to the values shown in Table 8 using supplied raw copper slurry, about 30% hydrogen peroxide, from Ashland Specialty Chemical, and copper sulfate pentahydrate, from Chem One Ltd. The pH was adjusted to the levels shown in Table 8 by adding an about 25% sulfuric acid solution, diluted at a ratio of about 1:1 with deionized water. The treated stream from ion exchange columns 512 and 514 were collected in collection tank 520.

Sample for analysis were retrieved at sample point 522 and at collection tank 520. Table 8 lists the inlet and properties of the slurry fluid for various test runs. The data show that copper was effectively removed even without the removal of hydrogen peroxide by the activated carbon subsystem as noted in test numbers 2, 4, 5, and 10. The data also show that treatment can be effected even on slurry streams having solids up to about 20,000 ppm.

TABLE 6

Oxidizer Removal by Granular Activated Carbon.

| Sample | Elapsed Time (hours) | Copper Concentration (mg/L) IN | POST RESIN | Total Solids (mg/L) IN | POST CARBON | POST RESIN | $H_2O_2$ (mg/L) IN | POST CARBON |
|---|---|---|---|---|---|---|---|---|
| 1 | 0    | 30.8 | 0.018   | 2,920 | 2,100 | 1,660 | 204 | <1   |
| 2 | 1.5  | 31.8 | 0.043   | 2,810 | 3,170 | 2,580 | 198 | <2.6 |
| 3 | 3.5  | 32.5 | <0.016  | 2,520 | 2,605 | 2,400 | 204 | <1.3 |
| 4 | 5.5  | 31.4 | 0.021   | 2,510 | 2,550 | 2,390 | 185 | <1.4 |
| 5 | 7.5  | 34.6 | 0.021   | 2,680 | 2,640 | 2,550 | 209 | <1   |

TABLE 7

Oxidizer Removal by Granular Filter Media.

| Sample | Elapsed Time (hours) | Copper Concentration (mg/L) IN | POST RESIN | Total Solids (mg/L) IN | POST BIRM® | POST RESIN | $H_2O_2$ (mg/L) IN | POST BIRM® |
|---|---|---|---|---|---|---|---|---|
| 1 | 0    | 28.3 | 0.186 | 2,920 | 3,430 | 2,510 | 214 | 95  |
| 2 | 1.5  | 29.2 | 0.322 | 2,750 | 2,910 | 2,750 | NA  | 88  |
| 3 | 3.5  | 29.5 | 0.844 | 2,870 | 2,890 | 2,840 | NA  | 108 |
| 4 | 5.75 | 30.6 | 2.87  | 2,820 | 2,895 | 2,840 | NA  | 161 |
| 5 | 7.75 | 30.5 | 2.84  | 2,790 | 2,810 | 2,840 | 201 | 170 |

(NA = not analyzed)

TABLE 8

Hydrogen Peroxide and Copper Removal.

| Test Number | pH | Flow Rate (gpm) | Total Solids (mg/L) | Copper (mg/L) | $H_2O_2$ (mg/L) | Copper Removed (%) | $H_2O_2$ Removed (%) |
|---|---|---|---|---|---|---|---|
| 1 | 3 | 3.5 | 12,795 | 54.9 | 64.6 | 99.6 | 100 |
| 2 | 4 | 5.4 | 6,044 | 8.98 | 43.8 | 99.4 | 8.7 |
| 3 | 2 | 1.6 | 8,532 | 9.02 | 1,632 | 98.1 | 94.6 |
| 4 | 4 | 1.6 | 4,932 | 97.6 | 672 | 100 | 88.6 |
| 5 | 4 | 5.4 | 15,240 | 84.5 | 2,074 | 99.3 | 51.6 |
| 6 | 2 | 5.4 | 6,140 | 87.3 | 663 | 99.5 | 100 |
| 7 | 3 | 3.5 | 10,305 | 42.8 | 1,887 | 99.5 | 100 |
| 8 | 3 | 3.5 | 10,630 | 45.3 | 1,802 | 99.2 | 100 |
| 9 | 2 | 1.6 | 17,750 | 83 | 476 | 99.7 | 96.4 |
| 10 | 2 | 5.4 | 19,180 | 7.39 | 2,142 | 96.3 | 74.9 |
| 11 | 4 | 1.6 | 18,240 | 8.86 | 536 | 99.1 | 100 |

Example 6

Photochemical Pretreatment by Electromagnetic Irradiation

Figure 5:
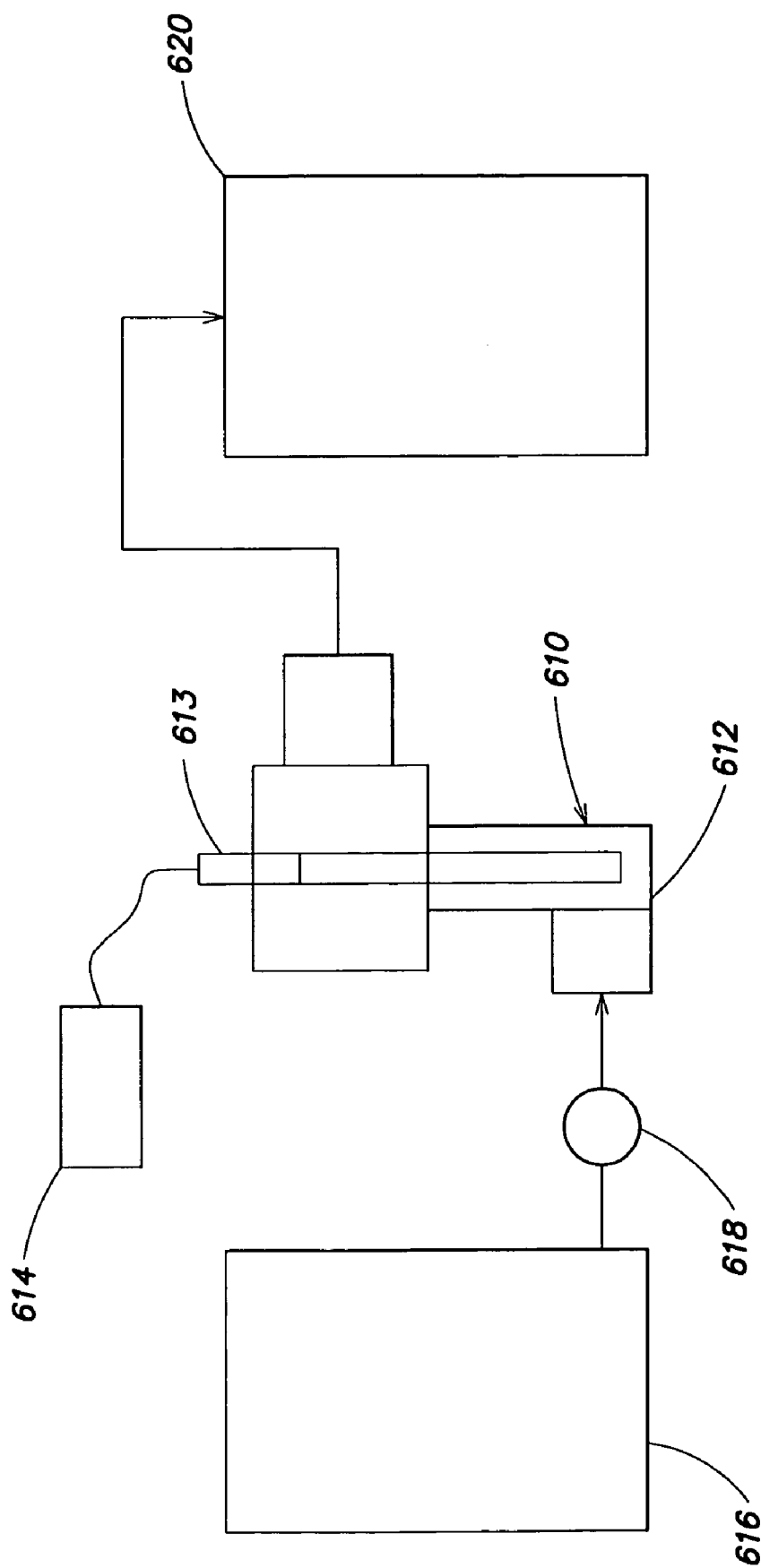
FIG. 5 is a schematic illustration of a pretreatment system described in Example 6.

In this example, removal or reduction of hydrogen peroxide from a typically CMP slurry stream was effected by techniques having no chemical addition. The nonchemically-based oxidizer reduction was effected by a pretreatment system based on photochemical reduction involving exposure to ultraviolet (UV) electromagnetic radiation as substantially illustrated in FIG. 5.

The pretreatment system 610 utilized a Model #AMD150B1/3T UV assembly, from Aquionics Inc., Erlanger, Ky., with an about 1.6 gallon volumetric capacity UV cell 612 having a 185 nm wavelength, model #130027-1001 medium pressure UV lamp 613. The lamp was operated at about 1 KW and powered by a power source 614. The solution to be treated, prepared as substantially described below, was pumped through the medium pressure UV cell 612 from a feed tank 616 using a pump 618 at a flow rate of about 0.75 gpm. The applied dosage of UV radiation at this flow rate was about 4,000 microwatt-sec/cubic centimeter. The irradiated fluid was collected in a collection tank 620.

The slurry stream was comprised of a mixture of silica-based and alumina-based commercially available copper CMP slurry concentrates diluted in deionized water in a ratio of about 0.5:0.5:20. The pH of the slurry stream was adjusted to about 3 pH units with sulfuric acid. A metal species was added to the slurry stream as copper sulfate pentahydrate. The oxidizer was added to the solution using a calculated aliquot of about 30% electronics grade hydrogen peroxide. The concentrations of the oxidizer and metal species prior to treatment are listed in Table 9. The data show that a pretreatment system comprising UV radiation techniques can reduce the oxidizer concentration.

These tests did not use ion exchange resin but focused on photochemically removing or reducing the concentration of oxidizing species. However, as shown in the tests in the above examples, the metal species, copper, would have been effectively removed by utilizing one or more embodiments of the treatment system of the invention.

It is expected that the higher UV dosage levels, longer retention time in the UV cell, and other techniques can further improve oxidizer species reduction; however, as noted in the examples above, especially with respect to Examples 4 and 5, it is not necessary to remove all the oxidizer species to achieve metal removal.

TABLE 9

Hydrogen Peroxide Decomposition by Irradiation.

| Test | pH | Flow Rate (gpm) | Total Solids (mg/L) | Influent $H_2O_2$ (mg/L) | Influent Copper (mg/L) | $H_2O_2$ Reduction (%) |
|---|---|---|---|---|---|---|
| 1 | 6.6 | 0.75 | 3,500 | 470 | 30 | 15 |
| 2 | 3 | 0.75 | 3,500 | 300 | 30 | 33 |
| 3 | 3 | 0.75 | 3,500 | 200 | 30 | 18 |

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways. For example, the invention contemplates the utilization of fluidized bed or similar unit operations wherein the ion exchange media is effectively fluidized by appropriately introducing the fluid to be treated at one or more bottom ports at a sufficient flow velocity.

Further, acts, elements, and features discussed only in connection with one embodiment are not intended to be excluded from a similar role in other embodiments. It is to be appreciated that various alterations, modifications, and improvements can readily occur to those skilled in the art and that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," and the like to modify a claim element does not by itself connote any priority, precedence, or order of one element over another or the temporal order in which acts of a method are performed, but are used merely as labels to distinguish one element having a certain name from another element having a same name (but for use of the ordinal term) to distinguish the elements.

Those skilled in the art should also appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. A method of treating a slurry stream comprising:
   providing the slurry stream comprising at least one metal and at least one oxidizer present at a concentration of at least about 50 mg/L; and
   introducing the slurry stream into an ion exchange column.

2. The method of claim 1, wherein the ion exchange column comprises ion exchange material comprising at least one complexing group.

3. The method of claim 1, wherein the ion exchange column comprises ion exchange material comprising at least one pendant functionality selected from the group consisting of iminodiacetate, polyamine, bispicolylamine, and aminophosphonic.

4. The method of claim 2, wherein the ion exchange material comprises an iminodiacetate functional group.

5. The method of claim 1, wherein the oxidizer concentration is less than about 1,500 mg/L.

6. The method of claim 5, wherein the at least one oxidizer comprises at least one species selected from the group consisting of iodates, periodates, bromates, perbromates, chlorates, perchlorates, peroxygen compounds, nitrate compounds, persulfate compounds, permanganate compounds, and chromate compounds.

7. The method of claim 6, wherein the at least one oxidizer comprises at least one compound selected from the group consisting of nitric acid, hydrogen peroxide, ferric nitrate, and ammonium persulfate.

8. The method of claim 7, wherein the at least one metal comprises a metal selected from the group consisting of copper, lead, nickel, zinc, cobalt, cadmium, iron, tantalum, silver, gold, platinum, palladium, iridium, rhodium, ruthenium, gallium, manganese, tungsten, hafnium, and mixtures thereof.

9. The method of claim 8, wherein the at least one metal is copper.

10. The method of claim 9, wherein the slurry stream comprises particulate material having a diameter in a range of about 0.001 μm to about 1 μm.

11. The method of claim 10, wherein the concentration of the particulate material in the slurry stream is in a range of about 50 mg/L to about 20,000 mg/L.

12. The method of claim 1, wherein no pre-treatment to remove the at least one oxidizer in a carbon column is performed before performing the step of introducing the slurry stream into the ion exchange column.

13. The method of claim 1, further comprising a step of neutralizing at least a portion of the at least one oxidizer.

14. The method of claim 13, wherein the step of neutralizing comprises adding at least one reducing species to the slurry stream.

15. The method of claim 13, wherein the step of neutralizing comprises chemically, electrochemically, photochemically, or thermochemically rendering at least a portion of the at least one oxidizer inactive.

16. A method of treating a chemical mechanical polishing slurry stream comprising introducing the slurry stream into a treatment system consisting essentially of at least one ion exchange unit comprising a chelating ion exchange resin.

17. The method of claim 16, wherein the chelating ion exchange resin comprises an iminodiacetic functional group.

18. The method of claim 17, wherein the slurry stream comprises solids having a diameter in a range of about 0.001 μm to about 1 μm.

19. The method of claim 18, further comprising introducing the slurry stream to a pre-treatment system that chemically, electrochemically, photochemically, or thermochemically neutralizes at least a portion of any oxidizing species in the slurry stream, prior to performing the step of introducing the slurry stream into the treatment system.

20. A method for fabricating an electronic component comprising:
    chemical mechanical polishing the electronic component with a slurry; and
    introducing at least a portion of the slurry to a treatment system consisting essentially of an ion exchange column comprising ion exchange material comprising an iminodiacetate functional group.

21. The method of claim 20, wherein the slurry comprises at least one oxidizing agent at a concentration of at least about 50 mg/L.

22. The method of claim 21 wherein the slurry comprises at least one metal species selected from the group consisting of copper, lead, nickel, zinc, cobalt, cadmium, iron, tantalum, silver, gold, platinum, palladium, iridium, rhodium, ruthenium, gallium, hafnium, manganese, and tungsten.

23. A treatment system for treating a slurry stream comprising at least one metal and at least one oxidizing species present at a concentration of at least about 50 mg/L, the treatment system comprising:
    an inlet fluidly connected to a source of the slurry stream; and
    means for reducing the concentration of the at least one metal from the slurry stream.

24. The treatment system of claim 23, wherein the at least one metal is a metal selected from the group consisting of copper, lead, nickel, zinc, cobalt, cadmium, iron, tantalum, silver, gold, platinum, palladium, iridium, rhodium, ruthenium, gallium, manganese, hafnium, and tungsten.

25. The treatment system of claim 23, wherein the at least one oxidizing species is selected from the group consisting of hydrogen peroxide, ferric nitrate, and ammonium persulfate.

26. The treatment system of claim 23, further comprising means for neutralizing at least a portion of the at least one oxidizing species.

27. The treatment system of claim 26, wherein the means for neutralizing at least a portion of the at least one oxidizing species electrochemically, photochemically, and/or thermochemically reduces a concentration of the at least one oxidizing species.

28. A method of facilitating treatment of a slurry stream having at least one metal species, comprising providing a treatment system consisting essentially of an ion exchange column having ion exchange media contained therein, wherein the ion exchange media comprises at least one pendant functional group capable of forming a complex with the at least one metal species.

29. The method of claim 28, further comprising a step of fluidly connecting an inlet of the treatment system to a source of the slurry stream.

30. The method of claim 28, further comprising a step of introducing the slurry stream into the treatment system.

31. A treatment system for treating a slurry stream comprising at least one metal and at least one oxidizing species, the treatment system consisting essentially of:
   an electrochemical, photochemical or thermochemical pretreatment unit; and
   at least one ion exchange column fluidly connected downstream of the pretreatment unit.

32. The system of claim 31, wherein the ion exchange column contains ion exchange media comprising at least one pendant functional group capable of forming a complex with the at least one metal.

33. The system of claim 32, wherein the at least one pendant functional group comprises an iminodiacetic functional group.

34. The system of claim 31, wherein the at least one metal is selected from the group consisting of copper, lead, nickel, zinc, cobalt, cadmium, iron, tantalum, silver, gold, platinum, palladium, iridium, rhodium, ruthenium, gallium, hafnium, manganese, and tungsten.

35. The system of claim 31, wherein the at least one oxidizing species is present at a concentration of at least about 50 mg/L.

36. A method of facilitating treatment of a chemical mechanical polishing slurry stream, comprising providing a treatment system consisting essentially of an ion exchange column having ion exchange media contained therein, wherein the ion exchange media comprises a cross-linked polystyrene substrate.

37. The method of claim 36, further comprising introducing the slurry stream into the treatment system.

38. The method of claim 1, wherein the ion exchange column comprises ion exchange material comprising a cross-linked polystyrene substrate.

39. The method of claim 28, wherein the ion exchange media comprises a cross-linked polystyrene substrate.

* * * * *